March 2, 1926.
J. H. JOHNSON
LUMBER STACKING DEVICE
Filed June 22, 1925
1,574,895
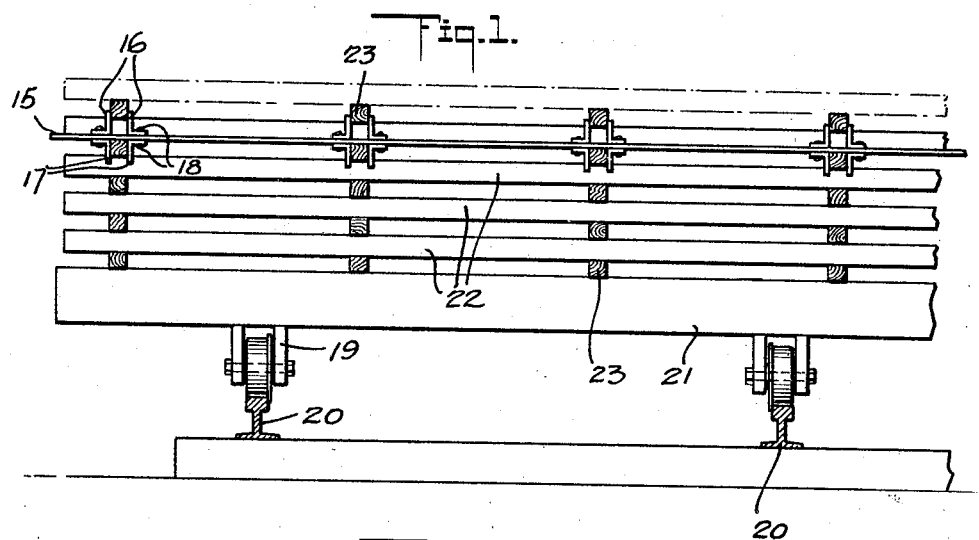
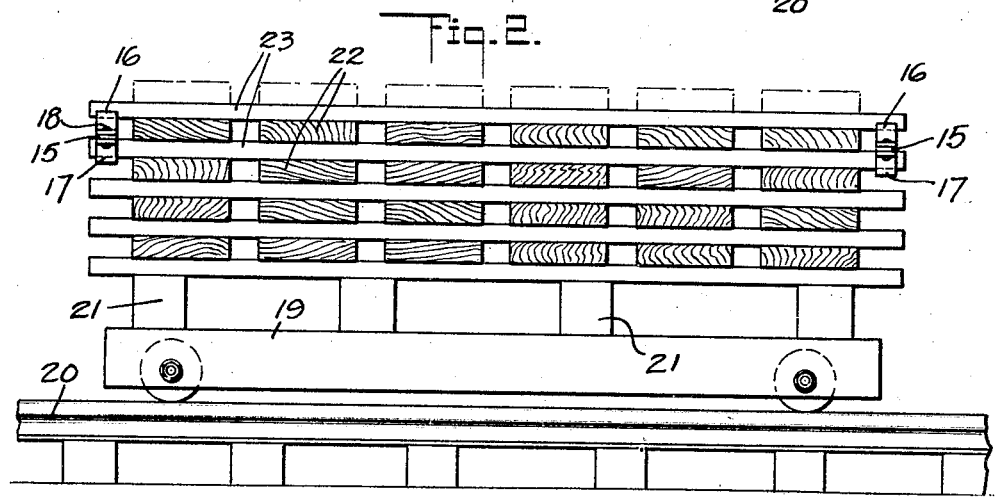
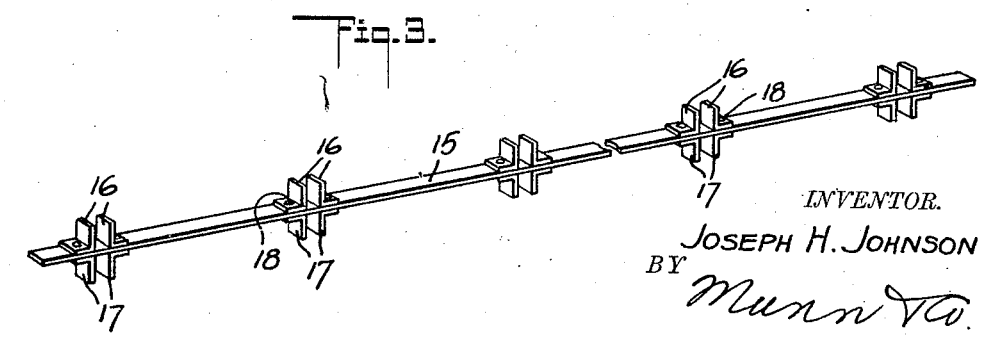
INVENTOR.
JOSEPH H. JOHNSON
BY Munn &Co.
ATTORNEY Patented Mar. 2, 1926.

1,574,895

UNITED STATES PATENT OFFICE.

JOSEPH H. JOHNSON, OF LOS ANGELES, CALIFORNIA.

LUMBER-STACKING DEVICE.

Application filed June 22, 1925. Serial No. 38,878.

*To all whom it may concern:*

Be it known that I, JOSEPH H. JOHNSON, a citizen of the United States of America, and a resident of Los Angeles, in the county of Los Angeles and State of California, have invented certain new and useful Improvements in Lumber-Stacking Devices, of which the following is a specification.

My invention relates to devices for the stacking of lumber on trucks preparatory to introducing the lumber into kilns for drying, and the purpose of my invention is the provision of an extremely simple, inexpensive and durable device which can be readily manipulated to vertically aline the usual spacing strips between the several pieces of lumber whereby the lumber can be quickly stacked and supported at identical points along its length so as to hold the lumber flat and true against warping and checking and the attendant loss in trimming.

I will describe only one form of lumber stacking device embodying my invention, and will then point out the novel features thereof in claims.

In the accompanying drawings,

Figure 1 is a view showing in front elevation a truck having a stack of lumber thereon and one form of stacking device embodying my invention in applied position thereto;

Figure 2 is a view showing a truck and lumber in side elevation with the stacking device in applied position;

Figure 3 is a detail perspective view of the stacking device shown in the preceding views.

Referring specifically to the drawings, in which similar reference characters refer to similar parts in each of the several views, my invention, in its present embodiment, comprises an elongated body 15 which in the present instance, is in the form of a flat strip of metal or other suitable material of a length corresponding substantially to the length of the pieces of lumber in connection with which it is to be used.

Spacing strip receiving members 16 and 17 are secured to the upper and lower sides of the body 15 and preferably at regular intervals along the length of the latter, the spacing of the upper member 16 being the same as the spacing of the lower member 17, as clearly shown in Figure 3. The members 16 and 17 are each formed of a pair of angle plates, the horizontal portions of which are secured to the body 15 by rivets or bolts 18, while the vertical portions extend upwardly and downwardly, respectively, from the opposite sides of the body with the vertical portions of each member in spaced relation so as to receive therebetween a spacing strip.

Referring now to Figures 1 and 2, I have here shown a truck 19 movable over rails 20 and having cross bunkers 21 upon which the lumber 22 is adapted to be stacked in layers, with adjacent layers separated by spacing strips 23.

In the stacking of the lumber, it is important that the spacing strips shall be in vertical alinement so as to hold the lumber flat and true against warping during the process of drying, and in order to effect this vertical alinement of the spacing strips with facility and dispatch the stacking device embodying my invention is designed. In practice, the several spacing strips 23 as applied upon any one layer of lumber are positioned to aline vertically with the spacing strips beneath by applying the stacking device in the following manner: The body 15 is arranged longitudinally of the lumber and transversely of the spacing strips so that the strips next beneath the body are received in the members 17, as illustrated in Figure 1, whereby the entire device is secured against longitudinal movement. It will be understood that the device can be applied to the projecting ends of the spacing strips, as illustrated in Figure 2, the spacing of the vertical portions of the members 17 being such as to slidably receive the spacing strips. With the device applied in this manner, the vertical portions of the members 16 project upwardly and above the next layer of lumber so that upon application of the next group of spacing strips they will be received between the projecting ends of the member 16 and thus secured in position so as to vertically aline with the spacing strips below. In this manner, the several layers of spacing strips can be successively applied so that the several layers of lumber are supported at the same points along the length to prevent warping and checking. As the constructions of the members 16 and 17 are identical, it will be manifest that the device is reversible to permit application thereof to the spacing strips from either side.

Although I have herein shown and described only one form of lumber stacking device embodying my invention, it is to be understood that various changes and modifications may be made therein without departing from the spirit of the invention and the spirit and scope of the appended claims.

I claim as my invention:

1. A lumber stacking device comprising an elongated body, and spacing strips receiving members at intervals along the length and at opposite sides of the body.

2. A lumber stacking device comprising an elongated body, and projections at intervals along the length of the body and at opposite sides thereof, said projections at either side of the body being arranged in pairs with the projections of each pair spaced apart to receive a spacing strip therebetween.

3. A lumber stacking device comprising an elongated body, angle plates secured at intervals along the length of the body and at opposite sides thereof, said plates at either side of the body being arranged in pairs with the plates of each pair spaced apart to receive a spacing strip therebetween.

4. A lumber stacking device comprising an elongated body, and members at intervals along the length and at opposite sides of the body, each member being adapted to slidably receive a spacing strip in a manner to permit application or removal of the device to or from the ends of the spacing strips.

5. A lumber stacking device comprising a body, means on the lower side of the body adapted to engage spacing strips for holding the body in definite position on the strips, and means on the upper side of the body against which other spacing strips can be placed to position the same in vertical alinement with the first spacing strips.

6. A lumber stacking device comprising an elongated body, and members at intervals along the length and at opposite sides of the body, said members being adapted to receive spacing strips in a manner to permit lengthwise movement of said strips therein but to hold the strips against transverse movement.

7. A lumber stacking device comprising a body, means on the lower side of the body adapted to engage spacing strips for holding the body in definite position on the strips, and means on the upper side of the body against which other spacing strips can be placed to position the same in vertical alinement with the first spacing strips, both the said means being of identical construction to permit reversing the body.

JOSEPH H. JOHNSON.